INVENTOR
HENRY JOHN CAULFIELD

ATTORNEY

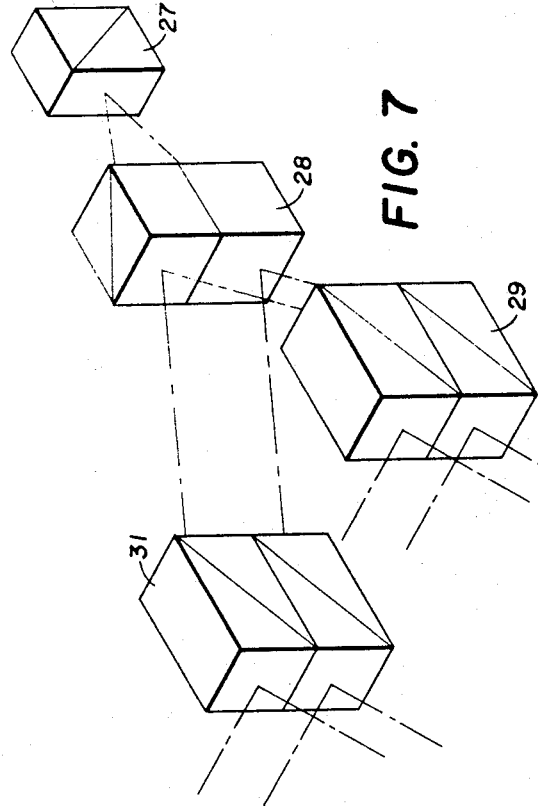
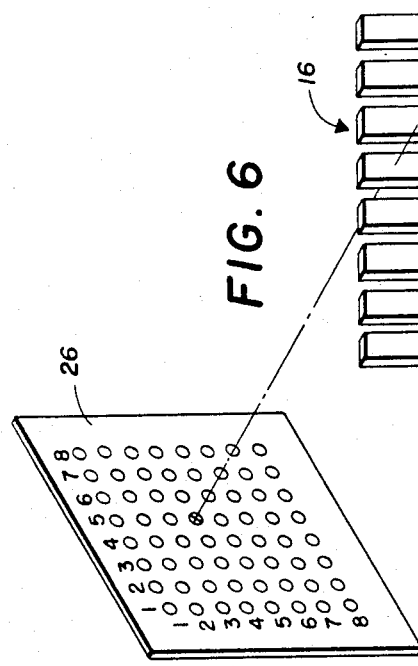
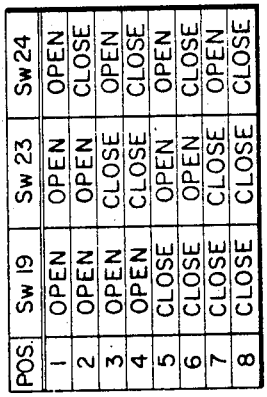

United States Patent Office 3,520,590
Patented July 14, 1970

3,520,590
DIGITAL LIGHT DEFLECTOR
Henry John Caulfield, Richardson, Tex., assignor to Texas Instruments Incorporated, Dallas, Tex., a corporation of Delaware
Filed Feb. 1, 1967, Ser. No. 613,207
Int. Cl. G02f 3/00, 1/26
U.S. Cl. 350—150                    10 Claims

ABSTRACT OF THE DISCLOSURE

A digital light deflector having N deflecting stages each including an electro-optic switch and a prism for generating a beam of light at $2^N$ possible positions. Each prism has at least two birefringent wedges of a material such as calcite, for angularly deflecting a polarized light beam incident thereon. The electro-optic switches control the plane of polarization of the light beam transmitted therethrough and thereby control the angle of deflection through its associated prism.

BACKGROUND OF THE INVENTION

Digital light deflectors, using electro-optic switches, have been suggested as a means for programing a high density optical memory of a computer. A source of linearly polarized light, e.g., laser light, is deflected through the digital light deflector to activate a bi-stable photosensitive surface of the computer's memory. It is only because of the high deflection speed of the light deflector using electro-optic switches, and the small size of the laser beam, that optical computer memories are now considered feasible. The propagation direction of a light beam through an electro-optic switch is immediately influenced by application of a voltage to said switch.

The basic components of all digital light deflectors are the electro-optic switch and a prism of a birefringent material. A linearly polarized light beam incident on the prism of a birefringent material leaves the prism in either one of two laterally displaced positions or, depending on the prism, in different angular directions. The displacement or direction, of the light beam from a prism of a birefringent material is determined by the plane of polarization of the incident light. To control the plane of polarization of the light incident on the prism the light beam is first passed through an electro-optic switch. Either of two orthogonal polarization states is selectable for the light beam by application of one of two different voltages to the electro-optic switch.

To achieve more than two light positions, the basic deflection stage, that is, the electro-optic switch followed by a prism of a birefringent material, is arranged in series. Any number of such stages can be used to generate the desired number of light positions. For N stages, it is possible to have $2^N$ light positions.

Prior to this invention, the prism in each succeeding stage in a multi-stage light deflector was necessarily twice as long as the prism in the preceding stage. This resulted in an unacceptably long deflector where a large number of light positions was required. As a result of this invention, it is possible to construct a light deflector wherein some of the prisms have the same width. Deflection of the light beam through each succeeding stage is accomplished by using the principle of the Wollaston Prism.

SUMMARY OF THE INVENTION

In accordance with this invention, there is provided a digital light deflector employing a plurality of prisms having at least two wedges of a birefringent material. The plane of polarization of the light beam incident upon each succeeding prism is orthogonally controlled by an electro-optic switch.

A more complete understanding of the invention and its advantages will be apparent from the specification and claims and from the accompanying drawing illustrative of the invention.

The drawing:

FIG. 5 is a table of switch conditions to generate light at the various possible positions;

FIG. 6 is a partial schematic of a three stage, rectangular array, digital light deflector;

FIG. 7 is a schematic of an optical series two-by-four rectangular array.

DESCRIPTION OF THE PREFERRED EMBODIMENTS

Figure 1:
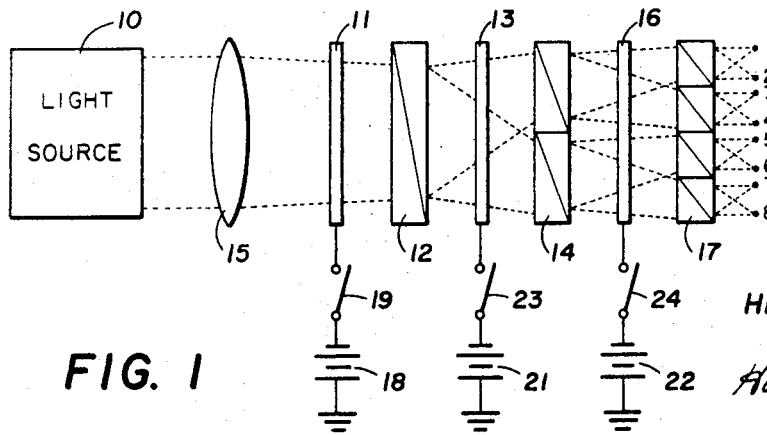
FIG. 1 is a schematic of the converging light three stage digital light deflector.

Referring to FIG. 1, there is shown a light source 10 generating a linearly polarized light beam having an arbitrary polarization orientation incident upon a converging beam lens 15. The light beam deflected through the deflecting system of this invention can be either converging or collimated. In FIG. 1, the converging beam from the lens 15 is incident upon the first stage of a three stage deflector. The first stage includes an electro-optic switch 11 and a prism 12 having two wedges of a birefringent material; the second stage includes an electro-optic switch 13 and a prism 14 having four wedges of a birefringent material; and the third stage includes an electro-optic switch 16 and a prism 17 having eight wedges also of a birefringent material. The electro-optic switch 11 of the first stage connects to a source of D.C. voltage 18 through a two-position switch 19. Similarly the electro-optic switches 13 and 16 are connected to D.C. voltage supplies 21 and 22 through two-position switches 23 and 24 respectively.

Light converging from the lens 15 is transmitted through the prism 12 to either the upper or lower section of the prism 14, depending on the plane of polarization established by the electro-optic switch 11. If the light is incident upon the upper section of the prism 14, it will be transmitted to either the first or second section of the prism 17 depending on the plane of polarization established by the electro-optic switch 13. A light beam incident upon the first section of the prism 17 will be deflected to focus at points 1 or 2 depending on the plane of polarization established by the electro-optic switch 16. If the light beam is incident upon the second section of the prism 17, it will be focused at either points 3 or 4, again depending on its plane of polarization as established by the electro-optic switch 16. If instead of the light beam being incident upon the upper section of the prism 14, it is incident upon the lower section, the light converging from the lens 15 will be focused at either point 5, point 6, point 7, or point 8, depending upon the plane of polarization of the light as established by the electro-optic switches 13 and 16. Thus, light converging from the lens 15 can be focused at one of eight possible points by selective energizing of the elector-optic switches 11, 13, and 16.

Because the deflection of a thin collimated beam through the various light deflecting stages is easier to visualize and describe, the remainder of this description will be concerned with a digital light deflector of a narrow collimated beam. It is to be understood, that what is described with regard to a collimated beam deflector also applies to a converging beam deflector. To further facilitate the understanding of this invention, the same reference numbers will be used throughout on identical components appearing in the various figures.

Figure 2:
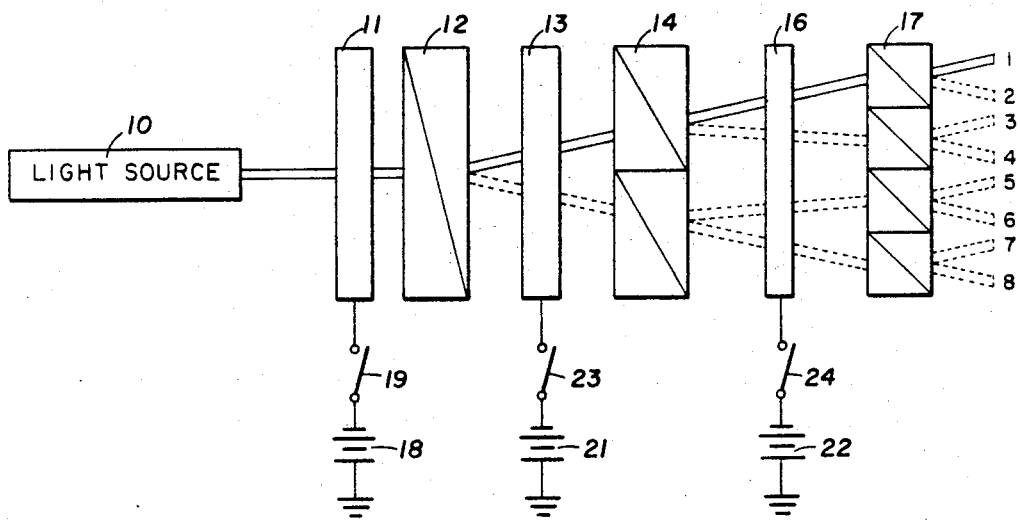
FIG. 2 is a schematic of a thin beam three stage digital light deflector.

The collimated beam deflector shown in FIG. 2 includes a light source 10 and three light deflecting stages; the first stage includes an electro-optic switch 11 and a prism 12 having two wedges of a birefringent material; the second stage includes an electro-optic switch 13 and a prism 14 having four wedges of a birefringent material; and stage 3 includes an electro-optic switch 16 and a prism 17 having eight wedges also of a birefringent material. The electro-optic switch 11 of the first stage connects to a source of D.C. voltage 18 through a two-position switch 19. Similarly, the electro-optic switches 13 and 16 are connected to D.C. voltage supplies 21 and 22 through two-position switches 23 and 24 respectively. A typical electro-optic switch uses the longitudinal electro-optic effect of potassium dideuterium phosphate (KD*P) crystals (Pockels effect). These switches could also be made from (potassium-tantalum niobate) KTN, or the electrically-optic glass disclosed by N. F. Barelli et al., in Applied Physics, vol. 7, page 117 (1965). With each of these materials, it is possible to switch between two orthogonal polarization states by applying no voltage, or the half-wave voltage to the crystals. In FIG. 2, the half-wave voltage is supplied by the D.C. voltage sources 18, 21, and 22. The no-voltage condition for the electro-optic switches 11, 13 and 16 is obtainable by merely opening the two-position switches 19, 23 and 24.

Figure 3:
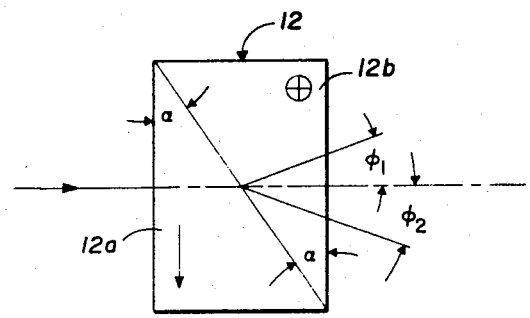
FIG. 3 is a diagrammatic of a two-wedge prism showing the light path therethrough.

Referring to FIG. 3, there is shown the prism 12 consisting of two equal right-triangle wedges made of a birefringent material, such as calcite, sodium nitrate (NaNO₃), or quartz, united along the common hypotenuse face into a single block. The refracting edge of the first wedge 12a is perpendicular to the optic axis of the crystal, whereas the refracting edge of the other wedge 12b is parallel to the optic axis. In FIG. 3, the direction of the optic axis is indicated by an arrow in the first wedge and a circled cross in the second. Thus, the optic axis of the first wedge 12a is in the plane of the paper, and the optic axis of the second wedge 12b is perpendicular to the plane of the paper.

Consider two plane linearly polarized light waves orthogonally positioned with respect to each other and incident normally to the face of the wedge 12a. The two waves traverse the first wedge 12a along exactly the same path, only the light wave polarized parallel to its optic axis, being slower, is retarded behind the light wave polarized in a direction perpendicular to the optic axis. Since the optic axis of the second wedge 12b is perpendicular to the optic axis of the first wedge 12a, the two waves will traverse the second prism in the reverse order. That is, the wave that is polarized perpendicular to the plane of the paper will be retarded in the second wedge 12b with respect to the wave polarized parallel to the plane of the paper. Therefore, the wave that traversed the first wedge 12a faster will, upon being refracted, traverse the second wedge 12b slower than the orthogonally positioned wave. Accordingly, the two waves will emerge from the prism 12 in divergent directions, and be widely separated. The angle of divergence shown in the drawing is greatly exaggerated as an aid in understanding this description. In an actual prism, the spacing between the two emerging beams may never exceed the width of one beam.

The angle of divergence between the two waves emerging from the prism 12 is approximately:

$$\theta = \phi_1 + \phi_2 \approx 2(n_e - n_o)\tan \alpha$$

where $n_o$ and $n_e$ are the indices of refraction of the birefringent materials, $\phi_1$ and $\phi_2$ are the angles the beams make with respect to the surface of the wedge 12b and $\alpha$ is the angle of the wedges. Where the incident wave is not normal upon the face of the wedge 12a, the angle of divergence of the two beams remains the same but the angle each beam makes with the face of the wedge 12b will now be:

$$\phi_1 \pm \phi_i$$

and $$\phi_2 \pm \phi_i$$

respectively, where $\phi_i$ is the angle of incidence. It is important to note that the angle of divergence from the wedge 12b is the angle of incidence for the prism of the following stage.

Figure 4:
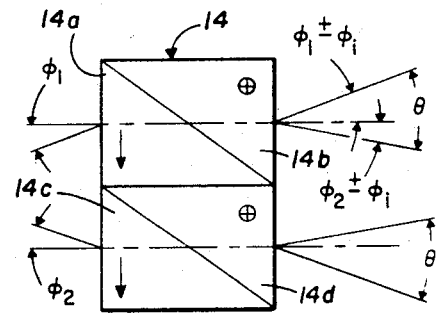
FIG. 4 is a diagrammatic of a four-wedge prism showing the light deflection therethrough.

Referring to FIG. 4, there is shown the prism 14 having four wedges of a birefringent material. Note, that the angle of incidence of the wave is not normal to the face of the wedges 14a and 14c. Instead, the angle of incidence is now equal to the angle subtended by a line drawn perpendicular to the face of the prism 12 and intercepting the emerging waves. Although the angle of divergence from the wedges 14b and 14d will be the same as the angle of divergence from the wedge 12b, assuming the length of the optical path through the prisms 12 and 14 are equal; the angle the emerging waves make with the face of the prism 14 will be changed by an amount equal to the angle of incidence. Thus, the angle of incidence of each succeeding prism will vary from the preceding stage by an amount equal to the angle of incidence to the preceding stage. As in prior art light deflectors, the angle of divergence, $\theta$, can be increased by increasing the optical length of the prism.

Assume now it is desired to have a light beam appear at position 1 of FIG. 2. The condition of the two-position switches 19, 23, and 24 is given in the table of FIG. 5. Referring to FIG. 5, for a light beam to appear in position 1, switch 19 is open, switch 23 is open, and switch 24 is open. Tracing the light beam from the light source 10 to the position 1, first it is transmitted through the electro-optic switch 11 without changing the plane of polarization established by the source. The light incident to and emerging from the prism 12 will also be polarized along the axis established by the light source 10. Since no voltage appears across the electro-optic switch 13, it transmits light along the axis emerging from the prism 12. The prism 14 transmits the light incident thereto to the electro-optic switch 16 along the plane established by the light source 10. The light beam is transmitted through the electro-optic switch 16 along the axis established by light source 10 since the two-position switch 24 is open and no voltage appears across the switch 16. Finally, the light beam passes through the prism 17 and emerges therefrom along a path that results in a light appearing at position 1.

For the light beam to appear at position 2, the two-position switches 19 and 23 are open, and the two-position switch 24 is closed, as shown in the table of FIG. 5. The light beam traverses through the first two stages of the system of FIG. 2 along a path identical to that described in the preceding paragraph. However, by closing the two-position switch 24, the electro-optic switch 16 is connected to the half-wave voltage of the D.C. voltage source 22 resulting in the electro-optic switch orthogonally rotating the light beam transmitted therethrough. Thus, the light beam incident upon the prism 17 will be orthogonally rotated with reference to the axis established by the light source 10, and the light beam will now appear at position 2.

The light from the source 10 could be traced through the system of FIG. 2 for any of the other six possible positions. The condition of the two-position switches 19, 23 and 24 is given by the table of FIG. 5. For example, for a light to appear at position 8, the two-position switches 19, 23, and 24 would all be closed. This results in the plane of the polarized light being orthogonally rotated every time it passes through an electro-optic switch.

The system shown in FIG. 2 and described above will produce light at one of eight possible positions in a single column. To produce a rectangular array it is only necessary to parallel the system of FIG. 2. For a square matrix having sixty-four possible positions, eight of the systems shown in FIG. 2 would be placed side by side.

Referring to FIG. 6, there is shown the electro-optic switch arrangement for producing a spot of light at any one of sixty-four possible positions in an eight-by-eight array. The D.C. power supplies 18, 21 and 22 are connected to an array of two-position switches 19, an array of two-position switches 23, and an array of two-position switches 24, respectively. Each of the two-position switches 19 is connected to an electro-optic switch 11, as described in FIG. 2. Similarly, each of the two-position switches 23 is connected to an electro-optic switch 13 and each of the two-position switches 24 is connected to an electro-optic switch 16. To avoid undue complication of the drawing, the prisms 12, 14, and 17 have been left out of FIG. 6. Of course, it is understood that such prisms are a necessity. A bank of eight prisms 12 having two wedges of a birefringent material would be positioned between the bank of electro-optic switches 11 and the bank of electro-optic switches 13. Similarly, a bank of eight prisms 14 having four wedges of a birefringent material would be positioned between the bank of electro-optic switches 13 and the bank of electro-optic switches 16. A bank of eight prisms 17 having eight wedges of a birefringent material would be positioned from the bank of electro-optic switches 16. It is to be understood that the respective eight systems shown in FIG. 6 and individually corresponding to the system shown in FIG. 2 are applicable to the corresponding vertical columns 1–8, inclusive, on the screen 26 reading from left to right. Thus, the system including the left-most electro-optic switches 11, 13, and 16 would control the position of a spot of light appearing in column 1 on the screen 26, for example. Again, it is to be understood that each of the eight systems would be selectively supplied with its own respective beam of linearly polarized light from a light source 10 (not shown).

Assume it is desired to produce a beam of light in row 4, column 5 on the screen 26. Referring now to FIG. 5, it will be noted that for a light beam to appear at position 3 of FIG. 2, the two-position switch 19 is open and the two-position switches 23 and 24 are closed. Thus, to produce a beam of light in row 4, column 5, a beam of linearly polarized light would be supplied to the fifth system from the left, with the fifth switch from the left in the bank of two-position switches 19 being open and the fifth switches from the left in the respective banks of two-position switches 23 and 24 being closed.

By projecting a beam of light from each of the eight systems onto a screen, such as screen 26 of FIG. 6, it is possible to produce a visual display. Although FIG. 6 shows a composite system using simple two-position switches to control the light beam to the desired position, it can be easily understood that the switching operation could be carried out by solid state devices controlled from a computer. By using computer controlled solid state switches, it is possible to produce a dynamic visual display on a screen with the system shown in FIG. 6.

It is also possible to generate a rectangular array by arranging the prisms in optical series. Referring to FIG. 7, there is shown a system for generating a two-by-four rectangular array. Only the prisms have been shown in the FIG. 7, it being understood that an electro-optic switch is positioned in the light beam incident upon each prism. A prism 27 having two wedges of a birefringent material receives a linearly polarized light beam from a source (not shown) which emerges from the prism in one of two positions depending on its plane of polarization.

A light beam emerging from the prism 27 is transmitted through an electro-optic switch (not shown), of the type described in FIG. 2, and is incident upon a prism 28 having four wedges of a birefringent material. The wedges of the prism 28 are rotated ninety degrees with respect to the prism 27. Depending on the plane of polarization of the light incident upon the prism 28, a light beam emerges therefrom in one of four possible positions. A light beam emerging from the prism 28 in one of the two positions toward the righthand direction is transmitted through a nelectro-optic switch (not shown) and is incident upon a prism 29 having four birefringent wedges. A light beam emerging from the prism 28 in either of the two positions toward the lefthand direction is transmitted through an electro-optic switch (not shown) and is incident upon a prism 31 also having four birefringent wedges. The wedges of the prisms 29 and 31 are positioned in the same direction as the wedges of the prism 27, but rotated ninety degrees with respect to the wedges of the prism 28.

A light beam incident upon the prism 27 will emerge from the prisms 29 and 31 in one of eight possible positions. Whereas in FIG. 2 the eight possible positions are in a single column, in FIG. 7 the eight possible positions are ranged in a two-by-four rectangular array. To generate an eight-by-eight rectangular array, such as described with reference to FIG. 6, it is only necessary to add additional stages to the system shown in FIG. 7.

In operation, the system of FIG. 7 is very similar to the system of FIG. 2. The electro-optic switches (not shown) would be connected to a source of half-wave voltage to control the plane of polarization of the light incident upon the various prisms. To direct the light beam from the source to one of the eight possible positions of the system of FIG. 7, requires the energizing of a predetermined pattern of electro-optic switches.

While several embodiments of the invention, together with modifications thereof, have been described in detail and shown in the accompanying drawing, it will be evident that various further modifications are possible in the arrangement and construction of components without departing from the scope of the invention.

I claim:
1. A digital light deflector comprising:
a plurality of parallel arrayed light sources each generating a beam of linearly polarized light,
an equal number of light deflectors individually positioned in the light beam from one of said light sources, said deflectors including a first stage having the linearly polarized light incident thereon and producing a polarized light beam in one of two positions, said first light deflecting stage including switching means for orthogonally rotating, when energized, the plane of polarization of light incident thereon, and a prism of two birefringent wedges receiving the polarized light beam from said switching means and emitting a light beam in one of two positions, each of said deflectors further including a plurality of additional light deflecting stages serially arranged to have light from the preceding stage incident thereon, one stage of the plurality of serially arranged stages having the light beam from the first stage incident thereon, each stage including switching means for orthogonally rotating, when energized, the plane of polarization of light incident thereon, and a prism having birefringent wedge pairs, the number of wedge pairs in a given stage equal to double the number in the preceding stage with the wedge pairs stacked in a plane oriented transverse of the incident polarized light beam, each prism receiving the polarized light beam from the associated switching means and emitting a light beam in one of a number of positions, the number of positions depending on the wedge pairs in the light deflecting stage, and
means for programming the operation of said light sources, and the energization of the switching means of said light deflectors to generate a light beam in any position of a rectangular array.

2. A digital light deflector as set forth in claim 1 wherein said switching means are electro-optic switches.

3. A digital light deflector as set forth in claim 2 including a source of half-wave voltage for each of said electro-optic switches.

4. A digital light deflector for linearly polarized light, comprising:
   a first light deflecting stage having the linearly polarized light incident thereon and producing a polarized light beam in one of two positions, said first light deflecting stage including switching means for orthogonally rotating, when energized, the plane of polarization of light incident thereon, and a prism of two birefringent wedges receiving the polarized light beam from said switching means and emitting a light beam in one of two positions, and
   a plurality of light deflecting stages serially arranged to have light from the preceding stage incident thereon, one stage of the plurality of serially arranged stages having the light beam from the first stage incident thereon, each stage including switching means for orthogonally rotating, when energized, the plane of polarization of light incident thereon, and a prism having birefringent wedge pairs, the number of wedge pairs in a given stage equal to double the number in the preceding stage with the wedge pairs stacked in a plane oriented transverse of the incident polarized light beam, each prism receiving the polarized light beam from the associated switching means and emitting a light beam in one of a number of positions, the number of positions depending on the wedge pairs in the light deflecting stage.

5. A digital light deflector as set forth in claim 4 wherein said switching means are electro-optic switches.

6. A digital light deflector as set forth in claim 5 including a plurality of voltage sources individually connected to said electro-optic switches.

7. A digital light deflector as set forth in claim 6 including means for selectively connecting said voltage sources to said electro-optic switches to produce the desired deflection of said beam through said prisms.

8. A digital light deflector as set forth in claim 4 wherein said prisms are of a calcite material.

9. A digital light deflector for linearly polarized light, comprising:
   first switching means for orthogonally rotating, when energized, the plane of polarization of light incident thereon;
   a first prism of two birefringent wedges having orthogonal optic axes receiving the polarized light beam from said first switching means and emitting a light beam in one of two positions;
   second switching means for orthogonally rotating, when energized, the plane of polarization of the light transmitted from said first prism, and
   a second prism of four birefringent wedges stacked in a plane oriented transverse of the incident polarized light beam, the first and third wedges of the stack having orthogonal optic axes to the second and fourth wedges.

10. A digital light deflector as set forth in claim 9, wherein the wedges of said prisms are of a quartz material.

References Cited
FOREIGN PATENTS 382,939  11/1932  Great Britain.
675,357  7/1952  Great Britain.

OTHER REFERENCES

Horton, "Conical Refraction Scanner," IBM Technical Disclosure Bulletin, vol. 6, No. 12 (May 1964) pp. 57–58.

Duda et al., "Light Beam Divider and Deflector," IBM Technical Disclosure Bulletin, vol. 8, No. 7 (December 1965) pp. 984–985.

DAVID SCHONBERG, Primary Examiner

P. R. MILLER, Assistant Examiner

U.S. Cl. X.R.
350—157